Feb. 26, 1952 R. J. ROCKWELL 2,587,529
ARM FOR HOLDING A STYLUS FOR
USE WITH SOUND RECORDS
Filed May 3, 1947
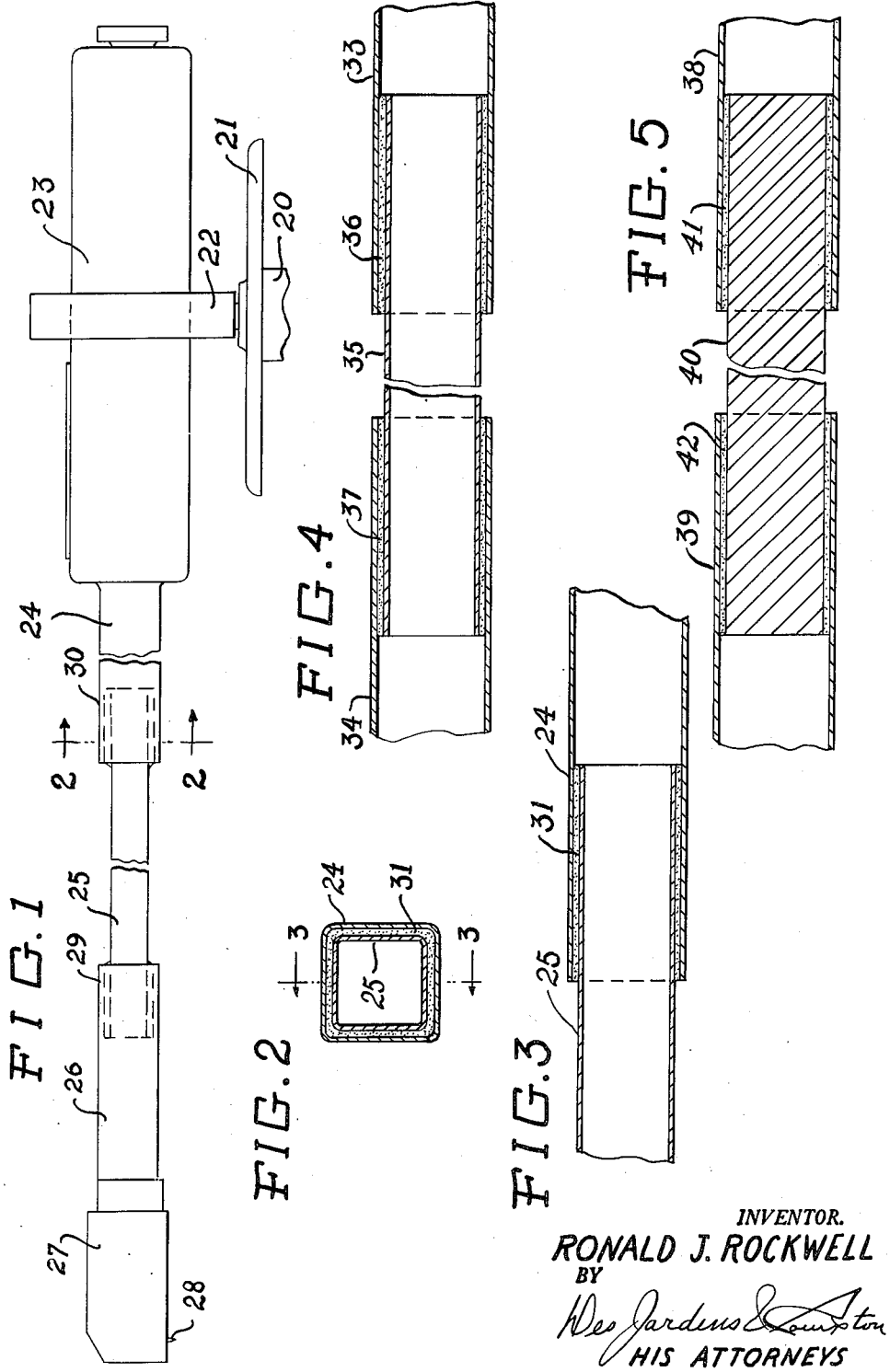
INVENTOR.
RONALD J. ROCKWELL
BY
Des Jardins & Sumpton
HIS ATTORNEYS Patented Feb. 26, 1952

2,587,529

UNITED STATES PATENT OFFICE 2,587,529

ARM FOR HOLDING A STYLUS FOR USE WITH SOUND RECORDS

Ronald J. Rockwell, Cincinnati, Ohio, assignor to Crosley Broadcasting Corporation, Cincinnati, Ohio, a corporation of Ohio Application May 3, 1947, Serial No. 745,697

2 Claims. (Cl. 274—23)

This invention relates to an arm for holding a stylus for use with sound records, and more particularly pertains to such an arm having, at one or more places along its length, a zone of vibration damping material which prevents transmission of vibrations along the arm.

When a stylus, held by such an arm, is vibrated in order to cut a sound record groove in a record, or is vibrated by the action of a sound track already cut in a record, some of the vibration is transmitted to the arm and, at certain frequencies, characteristic of the particular arm in question, sets up vibrations in the arm which considerably change the amount of the power input or output of the stylus. Because of the relatively large mass of such an arm, as compared to the stylus, when such resonant vibrations occur in the arm an appreciable change in the effective stylus action occurs, thus interfering seriously with the recording or reproduction.

I have provided a means for stopping such resonant vibrations of a stylus arm by providing at one or more places along the length of the arm, vibration damping zones, in which the slight vibrations of the arm are absorbed, thus preventing the occurrence of resonant vibrations. The damping material used at such zone or zones, physically insulates one part of the arm from the other, and, hence, must aid in supporting the arm, as it extends outwardly from its pivot point, in addition to acting as a damping material. In other words, in providing such a damping zone or zones, means had to be devised to create such zone or zones in a manner that did not interfere with the necessary stiffnesss of the arm which enables it to bridge over a record from a pivoted suspension point. I, therefore, devised a novel telescopic joint to be used at the point in the arm at which vibration is to be absorbed, and between the two parts of the telescopic arm, at the joint, I provide a layer of damping material. This damping material is interposed between the outer surface of the inner joint member and the inner surface of the outer joint member, and the material is of such nature that it acts as a bond to hold the joint intact, serves as stiffening material for the support of the arm, and serves the important function of an acoustical damping material.

The damping material I, preferably, employ is a nitrocellulose-camphor product plasticized to a leathery consistency with castor oil or tricresyl phosphate. In applying such material to the joint, I first incorporate into such material a suitable volatile solvent, in order to render the material soft enough to apply. Such a volatile solvent for the plasticized nitrocellulose-camphor product, which I prefer, is acetone. The liquefied material is then applied to the joint parts which are telescoped together after the damping material has dried to the proper consistency. Another way to make the joint is to wind strips of material on the inner member, and then telescope the inner and outer members together.

In modified forms of the invention the joint is not telescoped but is made with internal dowel pieces joining two parts of the arm, and the space between the dowel pieces and the parts of the arm being joined are interlaid with the aforementioned acoustic damping material.

Therefore, the principal object of my invention is to provide a stylus-holding arm for use with sound records, said arm having along its length a vibration absorbing zone or zones.

Another object of the invention is to provide a stylus arm with such a zone, by telescoping the arm at a joint which is interlaid with the damping material.

Another object of the invention is to provide such an arm with one or more joints, with or without dowel pieces, each of said joints being interlaid with damping material.

With these and other objects in view which will become apparent from the detailed specification and the claims which follow, I describe my invention in a preferred and modified form in connection with the drawings, in which:

Fig. 1 is a side elevation of a stylus-holding arm wherein two telescoping joints, interlaid with vibration insulating material, are provided.

Fig. 2 is a section on the line 2—2 of Fig. 1.

Fig. 3 is a section on the line 3—3 of Fig. 2.

Fig. 4 shows a modified form of joint in section along the arm, wherein a hollow dowel piece is used.

Fig. 5 shows a modified form of joint in section along the arm, wherein a solid dowel piece is used.

In the drawings the same reference numerals are applied to the same parts throughout the several views, and the sections are taken on the section lines looking in the direction of the arrows.

Referring to Figs. 1, 2 and 3, I show a typical stylus-holding arm, such as is described in my co-pending application for United States Letters Patent, Serial No. 737,594, filed March 27, 1947, now Patent No. 2,551,506, issued May 1, 1947, such arm being of the type used for electromagnetic translating devices, wherein electric wiring is passed through the interior of the arm to connect the electromagnetic device at the extremity of the arm to the electric circuit connected through the pivot of the arm. Therefore, I have shown in the preferred embodiment a construction wherein the sections of the arm are hollow to permit the passage of wire therethrough. The same is true of the modification shown in Fig. 4. The modification shown in Fig. 5 may be used where such hollow construction of the arm sections is not necessary.

Diagrammatically shown in Fig. 1 is a socket 20 depending from a foundation plate 21 in which a gimbal 22 is mounted for rotation about a vertical axis. In this gimbal 22 is mounted the stylus arm which has a rear orienting section 23, containing balancing structures, a forwardly extending section 24, which is hollow, a smaller neck spanning section 25 which is also hollow, another section 26 which is hollow, and a stylus holding head 27 which holds a stylus 28.

The manner of supporting the arm, the type of stylus head used, and the number of sections in the arm are not important in the consideration of the invention, the assembly shown in Fig. 1 being given mainly to show the environment in which my invention is used. I provide two joints 29 and 30 in the embodiment shown in Fig. 1, but the description of one joint is sufficient for the purpose of disclosing this preferred embodiment of my invention and, therefore, I show the joint 30 in Figs. 2 and 3, in section.

Referring to Fig. 2, section 24 and section 25, of the arm, have a modified square cross-section, which is preferable in order that section 25 will not turn or twist in section 24. These sections of the arm are preferably made of light-weight metal. The section 25 fits inside of section 24 with a clearance all around of about $\frac{1}{32}$ of an inch which clearance space is filled with the vibration damping material, the nitrocellulose-camphor product mentioned above, plasticized to a leathery consistency. The telescoping of the two joints is of the order of an inch or more so that too much pressure will not be applied to the interlaid damping material by reason of the cantilever action of the extended arm.

In applying the vibration damping material, as has been said, the plasticized nitrocellulose-camphor product is dissolved in acetone and this solution is applied to the overlapping part of section 25 of the arm and allowed to become tacky by reason of the evaporation of the acetone. The section 25 is then slipped into the section 24 and held therein so that the axes of the two sections are aligned, while the damping material assumes a set by reason of the further evaporation of the solvent. When set, the vibration damping material 31 fills the joint evenly all around. The damping material serves not only to effectively suppress transmission of vibrations in either direction along the arm and to hold the arm axially straight, but prevents the section 25 from being pulled out of section 24. In other words, the damping material acts not only in its capacity to prevent transmission of vibration, but acts as a bond and adhesive for holding the two sections together.

In Fig. 4 I have shown a representation of two outside sections of arm, section 33 and section 34, both hollow, which are joined together by a hollow dowel piece 35 telescoped into each section and separated from the outside sections by the layers of vibration damping material 36 and 37.

Fig. 5 shows outer sections of arms 38 and 39, which are hollow, and which are joined together by a solid dowel piece 40 which projects into the open ends of sections 38 and 39, and which is separated from said sections by the interlaid zones of damping material 41 and 42. The dowel pieces of Fig. 4 and Fig. 5 may be made of any rigid material which will support the extended end of the arm. In the modification shown in Fig. 4, it is apparent that wires can be run from section 34 to section 33, whereas in Fig. 5 the solid dowel piece blocks any such passage of wires.

I am aware that the device shown herein may be varied considerably without departing from the spirit of my invention and, therefore, I claim my invention broadly as indicated by the appended claims.

Having thus described my invention, what I claim as new and useful and desire to secure by Letters Patent, is:

1. A cantilever type horizontally mounted phonograph tone arm for a sound reproducer comprising, in combination, a stylus-holding member, an orienting member, and an intermediate spanning member therebetween, said stylus holding and orienting members being formed with hollow elongated rectangular tubular portions, said spanning member being rectangular and smaller in section than the other members and extending telescopically into said tubular portions thereby defining spaces at the overlapped portions of said spanning member with said other members, and plasticized nitro-cellulose camphor plastic acoustic damping material interposed in the spaces, said damping material being physically adhesively bonded to the contiguous overlapped surfaces of said members to join them permanently into a continuous unitary rigid non-rotatable structure with two acoustically damped joints at the ends of said spanning member intermediate the ends of the tone arm.

2. A cantilever type horizontally mounted phonograph tone arm for a sound reproducer comprising, in combination, a stylus-holding member, an orienting member, and an intermediate spanning member therebetween, said stylus-holding and orienting members being formed with hollow elongated non-circular tubular portions, said spanning member being non-circular and similar in cross section to said tubular portions of said stylus-holding and orienting members, said spanning member and said stylus-holding and orienting members being telescopically overlapped and defining spaces at the overlapped portions of said members, and plasticized nitro-cellulose plastic acoustic damping material interposed in the spaces, said damping material being physically adhesively bonded to the contiguous overlapped surfaces of said members to join them permanently into a continuous unitary rigid non-rotatable structure with two acoustically damped joints at the ends of said spanning member intermediate the ends of the tone arm.

RONALD J. ROCKWELL.

REFERENCES CITED

The following references are of record in the file of this patent:

UNITED STATES PATENTS

| Number | Name | Date |
|---|---|---|
| 97,454 | Spill | Nov. 30, 1869 |
| 1,195,783 | Crawford | Aug. 22, 1916 |
| 1,291,239 | Sturts | Jan. 14, 1919 |
| 1,792,957 | Wright | Feb. 17, 1931 |
| 1,844,623 | Yeider | Feb. 9, 1932 |
| 2,035,473 | Harrison | Mar. 31, 1936 |
| 2,154,093 | Hutter | Apr. 11, 1939 |
| 2,182,138 | Semple, Jr., et al. | Dec. 5, 1939 |
| 2,197,123 | King | Apr. 16, 1940 |
| 2,398,788 | Hedrick | Apr. 23, 1946 |
| 2,455,913 | Bauer | Dec. 14, 1948 |

FOREIGN PATENTS

| Number | Country | Date |
|---|---|---|
| 828,504 | France | May 19, 1938 |